No. 791,431. PATENTED MAY 30, 1905.
C. V. ROBERTS.
PROCESS OF FILTERING WATER.
APPLICATION FILED NOV. 28, 1903.
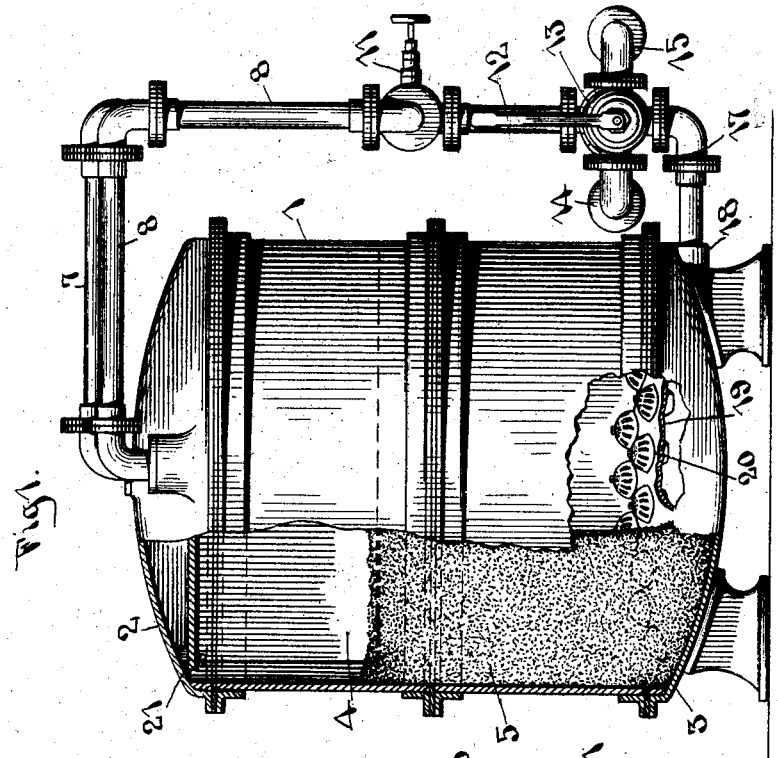
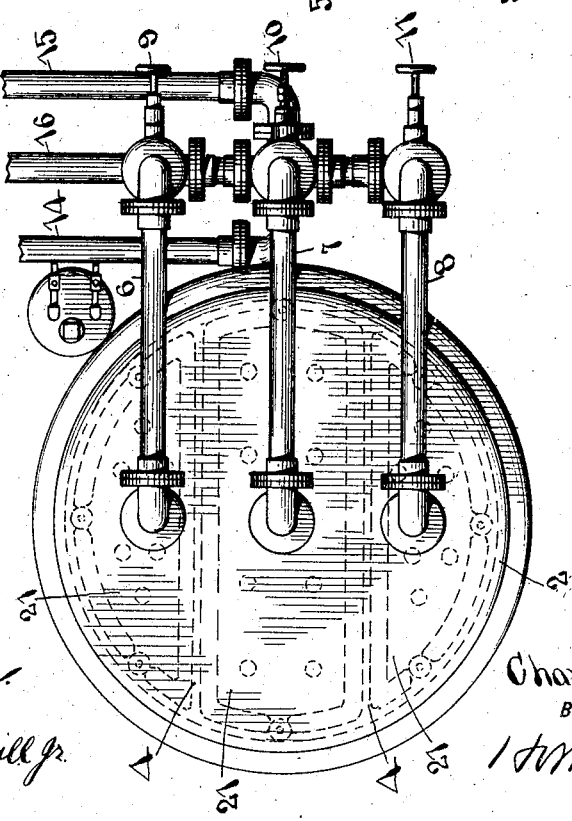
WITNESSES:
F. J. Hartman
Edw. W. Vaill Jr.
INVENTOR
Charles V. Roberts
BY
ATTORNEY.

No. 791,431.                                   Patented May 30, 1905.

UNITED STATES PATENT OFFICE.

CHARLES V. ROBERTS, OF PHILADELPHIA, PENNSYLVANIA.

PROCESS OF FILTERING WATER.

SPECIFICATION forming part of Letters Patent No. 791,431, dated May 30, 1905.

Original application filed June 26, 1903, Serial No. 163,155. Divided and this application filed November 28, 1903. Serial No. 183,005

*To all whom it may concern:*

Be it known that I, CHARLES V. ROBERTS, a citizen of the United States, and a resident of the city of Philadelphia, State of Pennsylvania, have invented certain new and useful Improvements in Processes of Filtering Water, of which the following is a full, clear, and complete disclosure.

Briefly my invention relates to those types of filters which are particularly adapted for use in dwelling-houses and other buildings and which require to be cleansed from time to time owing to the accumulation of sediment and other impurities from the water; and this application relates more particularly to a method or process for treating water in connection with the filters such that the filter may be used economically and efficiently and at the same time may be cleaned without inconvenience or complicated manipulation of the parts.

This application is a division of my prior application for improvement in water-filters filed June 26, 1903, Serial No. 163,155, the filter shown therein being particularly adapted for the process herein disclosed and claimed.

The principal object of my invention is to provide a process for treating filters and filtering material which can be easily carried out by the manipulation of valves and without removing the filtering material from the filter-chamber.

It is well known that after filters of the usual construction have been used for a certain period of time in filtering water or other liquids the sediment and impurities extracted from the water are deposited in the greatest amount upon the surface of the filtering material when the flow of the liquid to be filtered is downward, as is usually the case. The coarsest impurities are deposited practically on the surface of the filtering material, and the finer ones penetrate to greater depths below the said surface, according to their fineness, but the finest of them penetrate the filtering material only for a fraction of the depth of said material, the function of a large part of the filtering material being to produce chemical action for destroying bacteria and eliminating poisonous or undesirable gases or other decomposable substances.

Briefly my invention consists in causing the water to flow in one direction through the filtering material when the filtering operation is being carried on and then in the opposite direction when cleaning the filtering material, so as to carry away the sediment and other matter referred to and in confining the flow of the water or other fluid to definite portions of the surface of the filtering material, so that the force of the fluid is concentrated on definite segregated portions of said surface.

For a full, clear, and exact description of my improved process and one form of apparatus for carrying out the same reference may be had to the accompanying specification and to the accompanying drawings, forming part thereof, in which—

Figure 1 shows an elevation of one form of filter for carrying out my improved process, parts being broken away to show the filtering material therein and other features of construction; and Fig. 2, a top plan view of said filter, showing pipe connections.

Referring to the drawings, the numeral 1 indicates a casing, preferably cylindrical in form, which has attached to its upper and lower edges heads or plates 2 and 3. The upper head 2 has attached to its inner surface transverse plates 4, which are here shown as being two in number; but of course the number of plates may be varied to suit requirements, according to the size of the filter and the amount of flow of the fluid to be treated. These plates 4 extend downwardly from the head 2 into the interior of the cylindrical casing 1 for about a third of the height of said casing to a point at or adjacent the surface of the filtering material 5, the lower end of said plates 4 preferably entering the filtering material for such a distance as to be buried in the same for a small portion of their lengths, as indicated in dotted lines in Fig. 1. Approximately at the centers of the divisions of the head 2, formed by the plates 4, are attached pipes 6, 7, and 8, which are adapted to serve as inlet or outlet pipes, according to whether the filter is being used for filtering purposes or is being cleaned. The pipes 6, 7, and 8 are provided with valves 9, 10, and 11, respectively, which pipes after passing said valves unite into a common main 12, which leads to a universal controlling-valve 13. This controlling-valve is connected with the water-supply pipe 14 and to an outlet or delivery pipe 15, which supplies water to the points where it is to be used. A pipe 16 is also connected to said valve 13 and is adapted to carry off the waste water when the filter is being cleaned, but at other times is not in use. A pipe 17 also leads from the lower part of the valve 13 and enters the head 3 of the cylinder-casing, as indicated at 18. The valve 13 is so constructed that the water may be made to flow from the pipe 14 to the pipe 12 and through the pipes 6, 7, and 8 into the filter, through which it passes out by the pipe 17, and so into the outlet or delivery pipe 15, from which it passes to different parts of the house or other building. This is the normal working condition for filtering purposes.

Connected with the lower head 3 is a secondary head or diaphragm 19, which has openings 20 therein to permit the passage of water, said opening being provided with means for preventing the filtering material from escaping, but which at the same time allows the water to pass freely through in either direction.

In the upper part of the filter-chambers I provide baffle-plates 21, which are located below the ends of the pipes 6, 7, and 8, so as to distribute the water flowing in either direction during the filtering and cleaning operations. These baffle-plates are desirable, because the fluid in flowing through the sand tends to take the shortest path from the inlets to the outlets, and to make this flow even and uniform throughout the whole body of the filtering material baffle-plates are used.

The normal working conditions have all been described, and I shall therefore now proceed to describe conditions when the filter is being cleaned.

It will be supposed that the valves 10 and 11 have been closed and that the passage of water from the filter-chamber is confined to the pipe 6 by setting the valve 13 in the requisite position. The water then enters from the supply-pipe 14, passing through the valve 13 to the pipe 17, from which it passes into the space below the secondary head 19 and thence to the filter-chamber. In passing into the filter-chamber the water is divided into jets by the means covering the opening 20 and gives a cutting action to the filtering material within the filter-chamber, thereby thoroughly stirring up and separating said particles, so that the filtering material is more or less loosened throughout its entire body. In its passage through the filter-chamber the water converges in its flow toward one compartment formed by the partition of plate 4 and with which the pipe 6 communicates. It will thus be seen that the entire flow of water is concentrated toward said compartment and the surface of the sand and the body thereof for several inches downward are agitated to a very high degree, which agitation loosens all the impurities and solid matter which have become lodged therein owing to the flow of water or other fluid in the opposite direction to that when the filtering operation is being carried on. The filtering material is thus thoroughly cleansed at a point where such cleansing is required to the greatest extent and is accomplished by a flow of water which is much greater than that available without the division-plates 4, the intensity of the flow of water being in the proportion that the number of compartments is to the intensity of the flow of water in the downward direction when filtering. After each one of the compartments has been successively treated in this manner by closing different pairs of the valves 9, 10, and 11 said valves are all opened and the valve 13 is so set as to allow the water to pass through the filter in the normal direction, but is set in such a position that the water instead of going through the pipe 15 to the points of consumption is allowed to run to waste through the pipe 16, thus permitting the filter to become settled and to be put into good working order before the water is turned in to said supply-pipe and the house-mains. The valve 13 is then set in its normal position, so that the water after leaving the filter passes through the pipe 15 to the house-mains, thus leaving the apparatus in its normal condition for use. The valve 13 may also be manipulated or set so as to cut out the filter and turn the unfiltered water directly into the house-mains, or the valve 13 may be set to entirely cut off the water from both the filter and the house-mains.

The particular form of the valve 13 is not essential to the successful operation of this device, as any arrangement and form of valve may be used which will control the flow of water or other fluid in the right direction and at the right time.

Of course it is obvious that this process of filtering and treating filtering material may be used in connection with other fluids beside water, and also other filtering materials beside sand may be used in the filter-chamber, according to the requirements and nature of different fluids. I do not wish, therefore, to be limited to the form and arrangement of parts herein set forth for carrying out my process for filtering fluids and for treating filtering material, for any apparatus may be used which will produce the correct results; but the process herein set forth is particularly adapted, and I prefer to accomplish the same by means of the apparatus set forth in my copending application filed June 26, 1903, Serial No. 163,155.

Having thus described my invention, what I claim, and desire to protect by Letters Patent of the United States, is—

1. A filtering process, comprising, passing the fluid to be filtered through the entire body of the filtering material when filtering and then passing fluid in the opposite direction through the body of said material but confining its outflow to different segregated portions of the surface of said material.

2. A filtering process, comprising, passing the fluid to be filtered downwardly through the entire body of the filtering material when filtering and then passing fluid upwardly through the body of said material but confining its outflow to different segregated portions of the surface of said material.

3. A filtering process, comprising, passing the fluid to be filtered through the entire body of the filtering material when filtering and then passing said fluid through substantially the entire body of the filtering material in the opposite direction but confining its outflow to different segregated portions of the surface of said material, the quantity of flow in each case being substantially the same.

4. A filtering process, comprising, passing the fluid to be filtered downwardly through substantially the entire body of the filtering material then passing said fluid upwardly through substantially the entire body of said filtering material but confining its outflow to different segregated portions of the surface of said material, the quantity of flow in each case being substantially the same.

5. A process of cleaning filters which comprises the passing of fluid through substantially the entire body of the filtering material in a direction opposite to that in filtering but confining the outflow to different segregated portions of the surface of said material.

6. A process of cleaning filters which comprises the passing of fluid upwardly through substantially the entire body of the filtering material but confining the outflow to different segregated portions of said material.

In witness whereof I have hereunto set my hand this 27th day of November, A. D. 1903.

CHARLES V. ROBERTS.

Witnesses:
 LEWIS H. VAN DUSEN,
 EDW. W. VAILL, Jr.